J. M. WILLIAMS.
APPARATUS FOR BLEACHING AND AGING CEREALS.
APPLICATION FILED MAY 18, 1906. RENEWED AUG. 12, 1914.

1,132,058.

Patented Mar. 16, 1915.

WITNESSES:
V. E. Nichols
R. A. Mooney

INVENTOR
John M. Williams
BY Griffin & Bernhard
ATTORNEYS

UNITED STATES PATENT OFFICE.

JOHN MORRIS WILLIAMS, OF GUTHRIE, OKLAHOMA.

APPARATUS FOR BLEACHING AND AGING CEREALS.

1,132,058.  Specification of Letters Patent.  Patented Mar. 16, 1915.

Application filed May 18, 1906, Serial No. 317,635. Renewed August 12, 1914. Serial No. 856,494.

*To all whom it may concern:*

Be it known that I, JOHN M. WILLIAMS, a citizen of the United States, residing at Guthrie, in the county of Logan and State of Oklahoma, have invented certain new and useful Apparatus for Bleaching and Aging Cereals, of which the following is a specification.

My invention is an apparatus for bleaching and aging cereals and cereal products, and, more particularly, flour.

It consists of an apparatus wherein a liquid or other agent is subjected to electrolysis, whereby certain chemical agents or compounds are produced having the capacity or property of bleaching and aging flour and other cereals.

The invention further consists in the employment of means whereby the chemical agents or compounds, produced as aforesaid, may be forced or otherwise brought into contact with the cereal under treatment.

Furthermore, the invention contemplates the employment, under certain conditions, of means whereby the electrolytic decomposition of the liquid or other agent is facilitated, and, for this purpose, the liquid is preferably kept slightly agitated, whereby stratification of the liquid is prevented, the escape of gases from such liquid facilitated, and undue accumulation of gases on the electrodes prevented.

Figure 1:
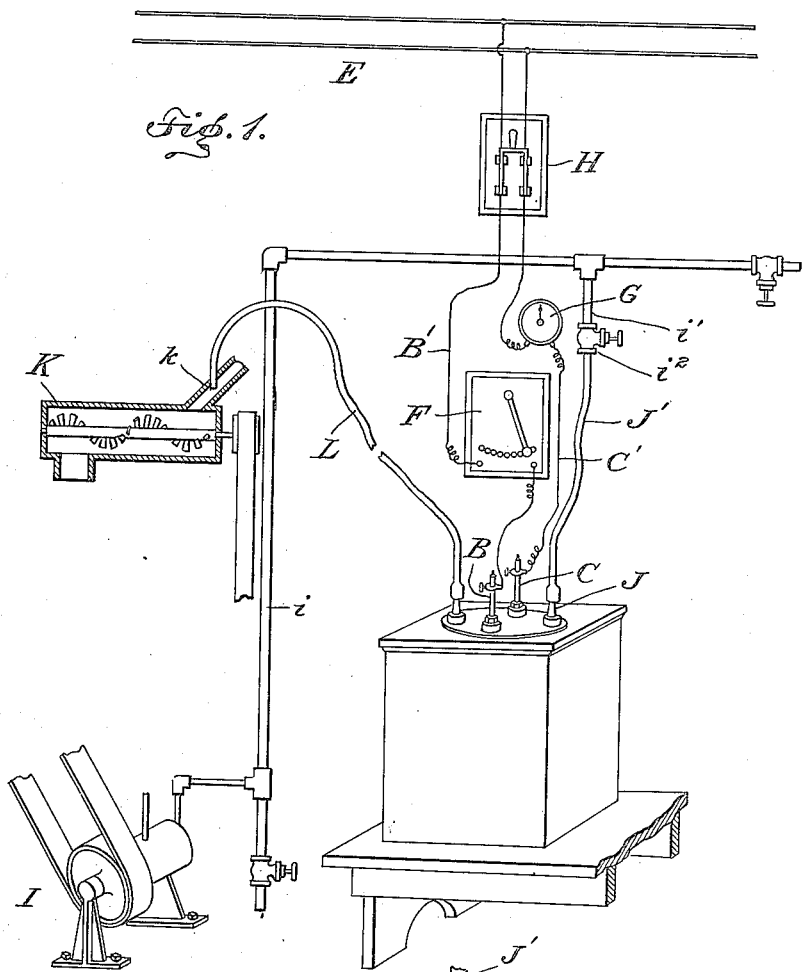
Figure 2:
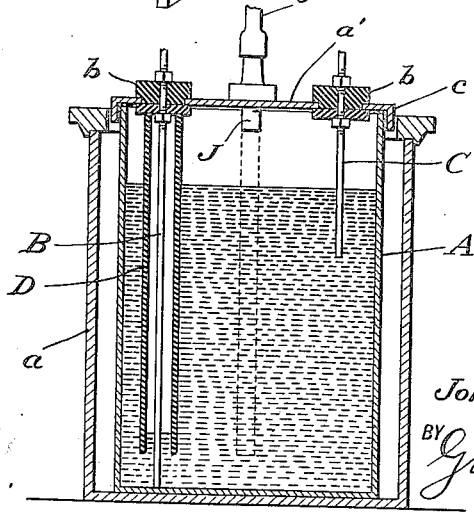

In the drawings, showing one embodiment of my invention, Figure 1 is a general view of the apparatus, a cereal treating chamber being shown partly in section; Fig. 2 is an enlarged vertical section through a cell wherein the decomposition of a liquid is effected by electrolysis as contemplated by this invention.

A designates a battery or cell adapted to be charged or partly filled with a liquid to be electrolyzed. A positive electrode or anode B, and a negative electrode or cathode C, are immersed in the liquid of this cell, said electrodes B, C, being suspended, preferably, from the top or cover of said cell. The electrodes are preferably composed of carbon. As shown, the cell A is inclosed within a suitable box or casing $a$, and the closure or head $a'$ of the cell is flush with the top of said casing, whereby the electrodes are readily accessible.

It is preferred to use a cell of non-conducting material, such as porcelain or pottery, to the body of which is attached the said cover $a'$, the latter being provided with a plurality of openings. In these openings are secured, as by cementing, two stuffing boxes $b$, for the passage of the electrodes, and two nipples for the attachment of the air inlet pipe and the eduction pipe, respectively. The stuffing boxes and the nipples are composed, preferably, of aluminum, this metal being capable of resisting the chemical action of nitric acid.

In first equipping the cell the cathode C is shorter than the anode B, so that it will not be immersed in the liquid to the same extent as the anode. An insulating jacket D incloses or envelops said anode for the major part of its length, but the lower part of the anode may, at the beginning of the operation, extend beyond the jacket, as shown in Fig. 2, thus exposing a portion of the anode for the free discharge of the current into the liquid of the cell. When commercial nitric acid is employed as the electrolyte, the positive electrode or anode is gradually eaten away by the action of the current to the extent of about one inch in six hours, depending upon the strength of the current. The jacket D is, preferably, composed of porcelain, although other acid-proof insulating materials may be used, and said jacket is supported in the cell by appropriate means, preferably by suspending it from the closure $a'$. The jacket prevents the acid from attacking the anode throughout its length, thereby enabling an anode to be used for a very much greater period of time than is the case when the jacket is not employed. The closure or head $a'$ should be attached to the body of the cell A in such manner as to secure an air tight connection therewith, and I may employ, for this purpose, a suitable packing or gasket $c$ between the cell and its closure. This top may, if desired, be integral with the body.

The current for decomposing the liquid in the cell A may be obtained from any suitable source of electric energy, an ordinary incandescent light circuit being well adapted for this purpose.

As shown, the apparatus is equipped with conductors B′, C′, which are attached to the anode B and cathode C, respectively, said conductors being branched onto an electric circuit E′, which is adapted to supply a current suitable for the purpose, preferably a current of low voltage.

The electrical installation may, and preferably does, include devices which are common to electrical equipments in many arts. As shown, a rheostat F is included in the positive conductor B'; an ammeter G is interposed in the negative conductor C', and a cut-out or switch H is in the branch circuit. These several devices may be of the usual or any preferred construction.

A current of air or other gas is supplied to the cell A, for the purpose of diluting the gases resulting from the decomposition of the liquid contained in said cell, and for the further purpose of establishing such pressure in the cell as will maintain a circulation of such gases from the cell to the apparatus for treating the flour, or other cereal. It is preferred to supply air, or other gas, to the cell under slight pressure. While ordinarily it is only necessary to introduce the air above the surface of the electrolyte, yet in some cases it may be discharged directly into the liquid of the cell A, for the purpose of agitating said liquid, whereby the decomposition of the liquid and the liberation of the gases are facilitated.

Nitric acid does not polarize, or allow gases to accumulate on the electrodes, but some electrolytes do, in which event the air or other gas introduced below the surface of the electrolyte frees the electrodes from the gases which may accumulate thereon. In Fig. 2 of the drawings, I have shown the air inlet pipe J in full lines as discharging above the surface of the electrolyte, and also in dotted lines as discharging below the surface thereof.

A suitable air pump, compressor or blower I supplies air at the required pressure to a pipe $i$, from which leads a branch pipe $i'$, having a cock or valve $i^2$. The pipe J is connected to the branch pipe $i'$ by a flexible tube or hose J', although a rigid metallic pipe may be employed, if desired.

An apparatus for treating flour is indicated generally at K in Fig. 1, said apparatus having a feed spout $k$. The gaseous products from the cell A are conducted to the feed spout $k$ by an eduction pipe or tube L, one end of which is attached to the head or closure $a'$ for communication with the chamber of the cell above the liquid level therein. The other end of the pipe or tube L is shown as extending a short distance into the feed spout $k$, for the purpose of conveying the bleaching agent to the flour treating apparatus, thus subjecting the flour to the direct action of said bleaching agent.

The apparatus is operated as follows: The cell A is partially filled with the electrolyte, the electrodes, B, C, the jacket D, and the air pipe J, being suitably adjusted. The chemical agent may be any acid or salt suitable for bleaching cereals, but I have found commercial nitric acid of a strength of about 36 degrees Beaumé to be particularly suitable for this purpose. The proper connections having been made with the electric circuit, the air pump, and the flour treating apparatus K, the switch H is closed and the pump I started, whereby an electric current is sent through the liquid in the cell A, and at the same time a current of air is delivered to the cell. The electric current decomposes the electrolyte, thereby producing gases in the cell A. These gases are diluted by admixture with the air, or other agent, and the pressure established in the cell A, by said air, forces the gaseous bleaching agent through the eduction tube or pipe L. The bleaching agent is brought into direct contact with the flour while the latter is, preferably, in a state of agitation, whereby said flour and bleaching agent are intimately commingled.

The gases resulting from the electrolytic decomposition depend, of course, on the particular agent or agents electrolyzed, but where nitric acid is employed for this purpose there results nascent oxygen, hydrogen, carbonic acid, certain compounds of nitrogen and probably other gases.

The action of the gases on the flour is almost instantaneous, and practical experience has shown that when flour is treated in the manner described, it is not only whiter and makes superior bread, but its keeping qualities are very materially enhanced.

It will be apparent to those skilled in the art that in practising my invention it is not necessary to employ the specific form of apparatus herein described and claimed.

Having thus described my invention, what I claim as new and desire to secure by Letters Patent is:—

1. In an apparatus of the class described, means for electrolytically decomposing a liquid, thereby producing a gaseous bleaching agent, a cereal treating chamber, and means for conducting such bleaching agent to the cereal treating chamber.

2. In an apparatus for bleaching and aging cereals, means for decomposing a liquid electrolytically in a closed chamber, thereby producing a gaseous bleaching agent, means for establishing pressure in said chamber for facilitating the escape of gases therefrom, a cereal treating chamber and means for conducting a bleaching agent to the cereal treating chamber.

3. In an apparatus for bleaching and aging cereals, means for decomposing a liquid by electrolysis, whereby a bleaching agent is produced, means for supplying a gaseous agent to said means, a cereal treating chamber, and means for conducting the bleaching agent to the cereal treating chamber.

4. In an apparatus for bleaching and aging cereals, a cereal treating chamber, means for electrolytically decomposing a liquid in a closed chamber, means for supplying air under pressure to said chamber, thereby producing a bleaching agent, and means for conducting said bleaching agent to the cereal treating chamber.

5. In an apparatus for bleaching and aging cereals, a cereal treating chamber, means for electrolytically decomposing a liquid, means for introducing a gaseous agent under pressure into the body of said liquid, whereby said gaseous agent is adapted to agitate the liquid, and means for conducting the resulting bleaching agent to the cereal treating chamber.

6. In an apparatus for bleaching and aging cereals, a cereal treating chamber, means for decomposing a liquid by electrolysis within a closed vessel, thereby producing a gaseous bleaching agent, means for supplying a diluting agent to said closed vessel, the bleaching and diluting agents being free to combine in said vessel, and means for conducting said bleaching agent to the cereal treating chamber.

7. In an apparatus for bleaching and aging cereals, a cereal treating chamber, a closed chamber adapted to contain a liquid, electrodes in said chamber, an air pipe for supplying air to the chamber, and an eduction pipe for conveying a gaseous bleaching agent from the chamber to said cereal treating chamber.

8. In an apparatus for bleaching and aging cereals, a cereal chamber, a closed chamber adapted to contain a liquid, electrodes in said chamber, an air inlet pipe extending into the chamber below the liquid level therein, an eduction pipe communicating with the chamber, and means for conducting bleaching agents produced in the said closed chamber to the cereal treating chamber.

9. In an apparatus for bleaching and aging cereals, a cereal treating chamber, means for generating a gaseous bleaching agent electrolytically, means for diluting said agent, and means for conducting said bleaching agent to the cereal treating chamber.

10. In an apparatus for bleaching and aging cereals, a cereal treating chamber, means for generating a gaseous bleaching agent electrolytically, means for mixing said agent with air, and means for conducting said bleaching agent to the cereal treating chamber.

11. In an apparatus of the class described, a closed electrolytic cell, a casing inclosing the same, suitable electrodes in said cell, means for introducing air into said cell, a flour treating chamber, and means for conducting the gaseous products of electrolysis from the electrolytic cell to the flour treating chamber.

In testimony whereof I have signed my name to this specification in the presence of two subscribing witnesses.

JOHN MORRIS WILLIAMS.

Witnesses:
A. M. WILLIAMS,
GEO. H. WIETES.